INVENTORS
KENNETH D. GARNJOST
LEWIS H. GEYER
GEORGE W. HAWK
PHILIP S. MONTGOMERY
WILLIAM J. THAYER
BY Popp and Sommer
ATTORNEYS June 28, 1966 K. D. GARNJOST ETAL 3,257,911
FLUID POWERED SERVOMECHANISM OF A REDUNDANT, MAJORITY
VOTING TYPE
Filed Aug. 15, 1963 5 Sheets-Sheet 2
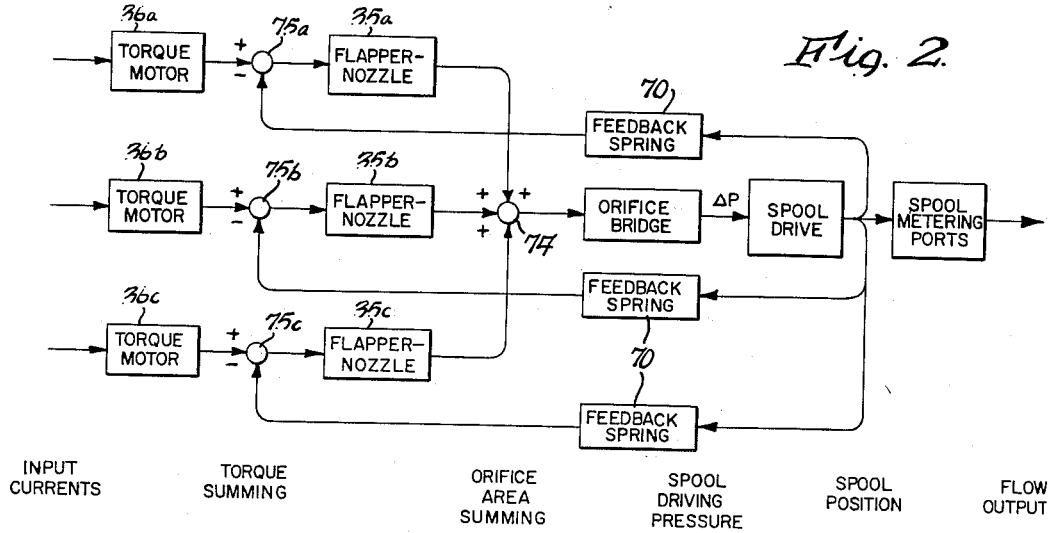
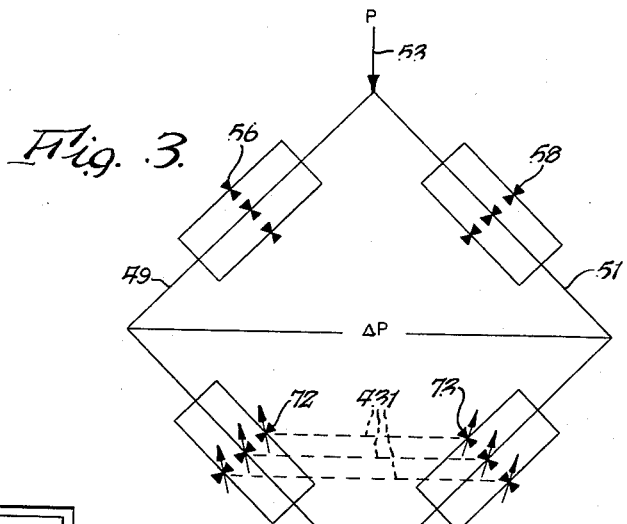
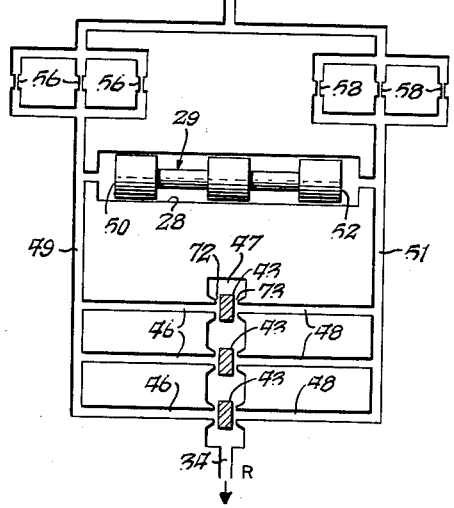
INVENTORS
KENNETH D. GARNJOST
LEWIS H. GEYER
GEORGE W. HAWK
PHILIP S. MONTGOMERY
WILLIAM J. THAYER
BY
Popp and Sommer
ATTORNEYS INVENTORS
KENNETH D. GARNJOST
LEWIS H. GEYER
GEORGE W. HAWK
PHILIP S. MONTGOMERY
WILLIAM J. THAYER
BY
Popp and Sommer
ATTORNEYS

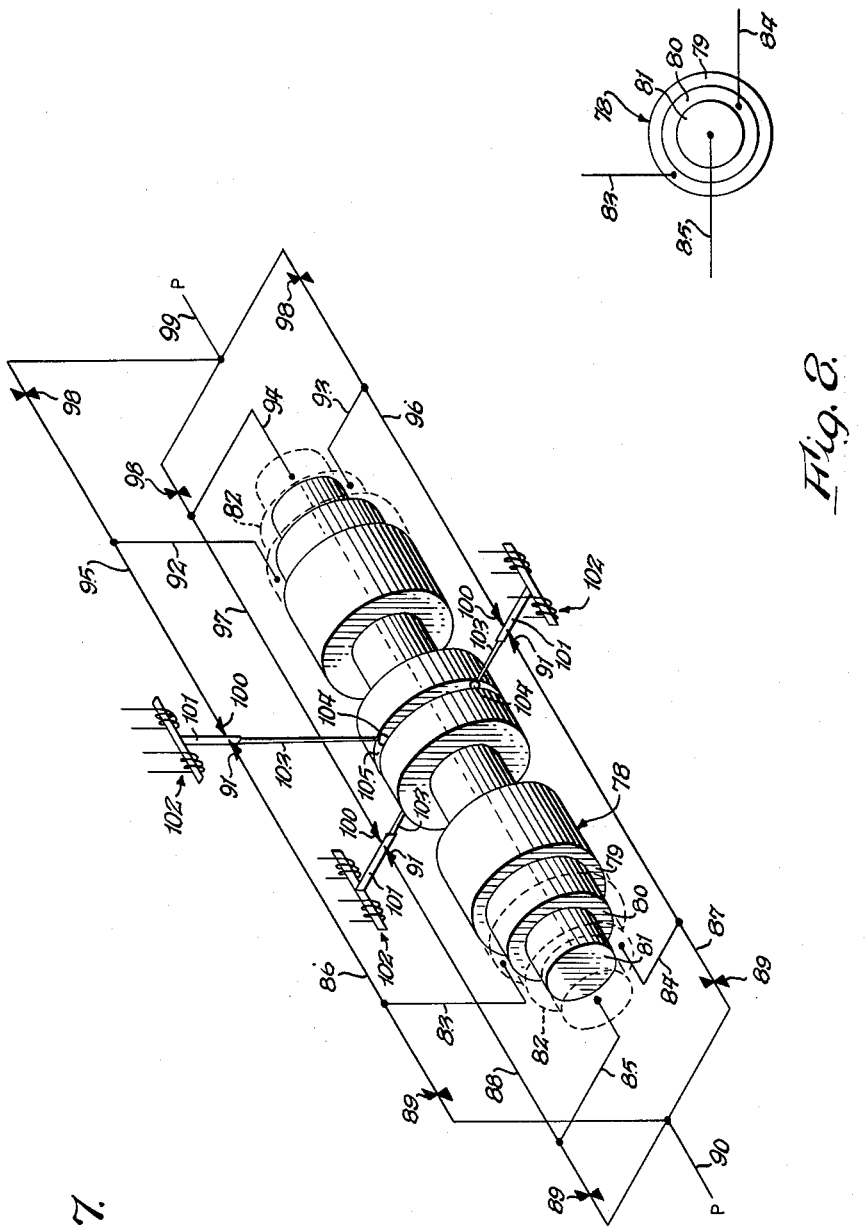

United States Patent Office 3,257,911
Patented June 28, 1966

3,257,911
FLUID POWERED SERVOMECHANISM OF A REDUNDANT, MAJORITY VOTING TYPE
Kenneth D. Garnjost, Buffalo, Lewis H. Geyer and George W. Hawk, East Aurora, Philip S. Montgomery, Snyder, and William J. Thayer, East Aurora, N.Y., assignors to Moog Inc., a corporation of New York
Filed Aug. 15, 1963, Ser. No. 302,256
6 Claims. (Cl. 91—48)

This invention relates to improvements in a fluid powered servomechanism, and more particularly to one of a redundant, majority voting type.

Critical failures of automatic controls in certain applications, notably space vehicles and high performance aircraft, may be catastrophic and cause loss of vast economic investment and human life. A number of such control systems include fluid powered servomechanisms having power output elements. The reliability of these elements has been adequate for unmanned space vehicles and for manner flight where manual override has been practical. However, currently planned space vehicles and supersonic aircraft will encounter certain flight regimes where reliance on manual control, even as an emergency measure, is no longer possible. These requirements present the problem of achieving a substantial improvement in the reliability of fluid powered servomechanisms.

Historically, the reliability of such servomechanisms has been significantly, but gradually, increased through continuing design innovation. However, experience in critical applications has indicated that the major reliability problem is associated with short term, random failures due to human error. The substantial improvement now needed is therefore much more than can reasonably be expected from normal state-of-the-art design evolution. The recognized solution to this dilemma is to resort to paralell redundancy of critical components or systems. The application of redundancy techniques to fluid powered servomechanisms is not straightforward because of problems peculiar to these devices.

Control system failures may be classed as either passive, in which failure removes power from the system; or active, in which failure results in uncontrolled application of power to the system. Since fluid powered servomechanisms are susceptible to active failures, they require a redundant configuration in which the failed component, according to the present invention, is overpowered. Configurations in which the effect of a failed component is overpowered, depend on the presence of a majority of unfailed components which outvote the failure; hence the term "majority voting."

In this majority voting type of redundancy, three information channels are required to perform the necessary logic to contend with a failure so that a majority can be provided to overpower a failure.

Fluid powered servomechanism systems include a number of components covering a wide range of power levels and interconnected in multiple feedback loops. Redundancy of the higher power level components is unattractive due to their weight and is generally not required because they can inherently be made more reliable. This choice of the degree of redundancy must be considered together with the type of redundancy in order to locate the voting point.

Choice of a redundant system for any real application must consider the limitations imposed by physical characteristics of the components required. The servomechanism systems here involved are typically fluid operated power controls having low-level electrical command inputs. The controlled variable is generally position and the system therefore includes a displacement feedback transducer, a summing amplifier, an electrohydraulic servovalve, and a hydraulic actuator. While the output position is necessarily a single channel, there may be one, two, or three input channels depending on the degree of redundancy of the input signal.

Redundant hydraulic pressure sources are commonly provided for such systems to protect against pump or related failures. Since pressure loss is a passive failure, simple duplication can provide adequate redundancy. However, operation of three information channels from two power sources presents a problem. Use of three power sources is generally not desirable because of the excessive weight penalty so other alternatives are necessary.

Similarly, duplication of power output elements imposes a weight penalty. A fluid operated piston and cylinder are extremely simple mechanical parts and can be designed with conservative factors of safety, so duplication is often not necessary. In fact, doubling the design stress levels for an actuator may require less weight than providing two actuators, and may actually achieve a greater increase in reliability.

While it may also be possible to limit redundancy of power control elements, the delicate instrument nature of feedback transducers, amplifiers and the low power level portions of servovalves calls for redundant protection. The essential complexity of these components creates the possibility of random failures which cannot be avoided by simple overdesign. The servomechanism configurations described later herein offer improved means for providing redundancy of these components.

It is accordingly the primary object of the present invention to provide a fluid powered servomechanism of the redundant, majority voting type. This has the advantage of automatic and instantaneous error correction and further contends with any degree of error.

A further object is to provide a fluid powered servomechanism of the redundant, majority voting type which can be operatively associated with two fluid supply sources.

Other objects and advantages of the invention will be apparent from the following detailed description of several embodiments illustrated in the accompanying drawings wherein:

FIG. 1 is a diagrammatic view of a secondary injection control system for thrust vector control of a rocket engine and shown as employing a redundant, majority voting type electrohydraulic servovalve operatively associated with triply redundant inputs, feedback transducers and valve driving amplifiers, said servovalve illustrating an example of a fluid powered servomechanism operating on the principle of summing effective orifice areas and constituting one embodiment of the present invention.

FIG. 2 is a block diagram of the servovalve illustrated in FIG. 1.

FIG. 3 is an elemental hydraulic bridge circuit diagram of the servovalve shown in FIG. 1.

FIG. 4 is a more schematic bridge diagram of the servovalve shown in FIG. 1.

Figure 1:
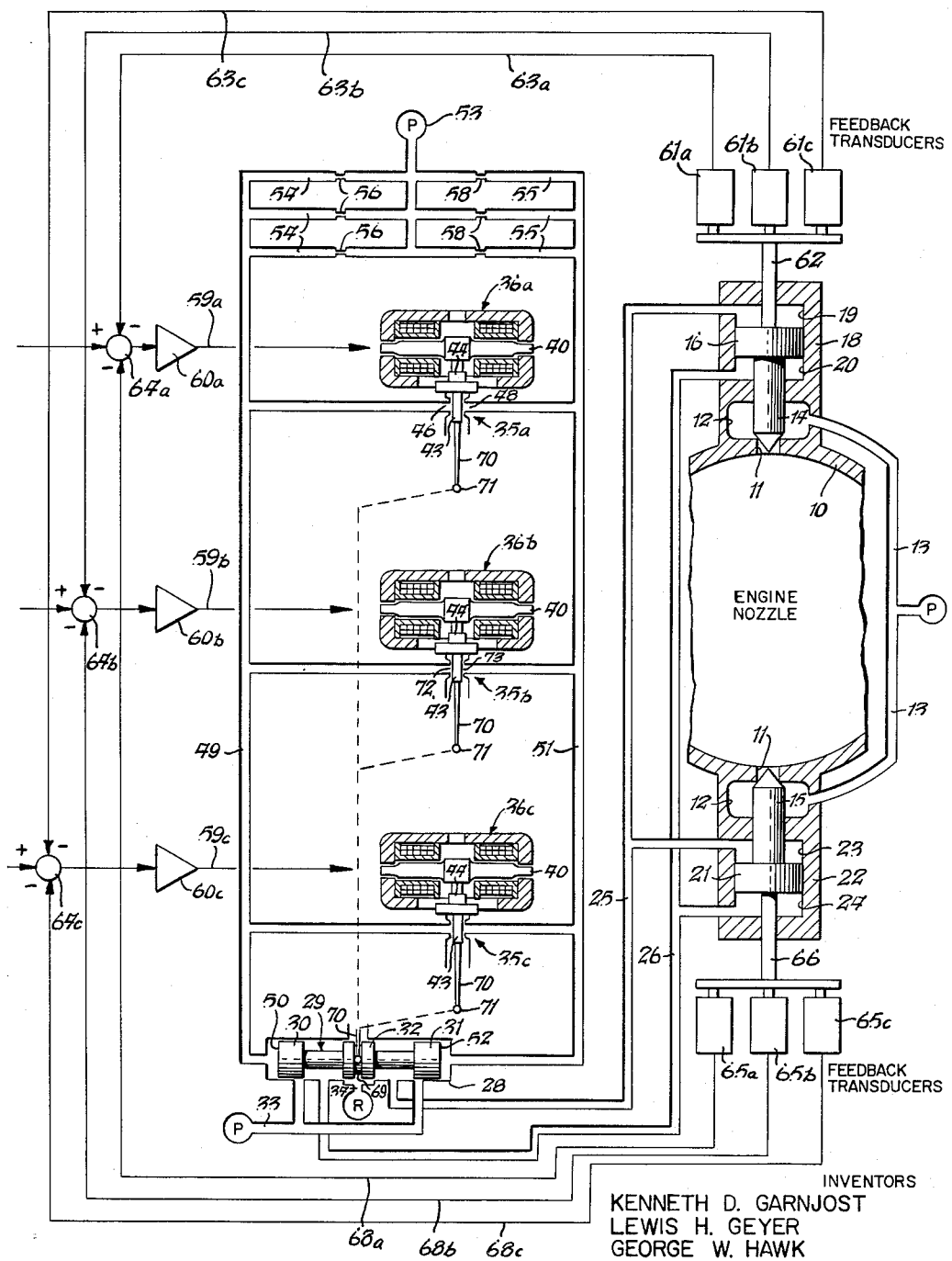
Figure 5:
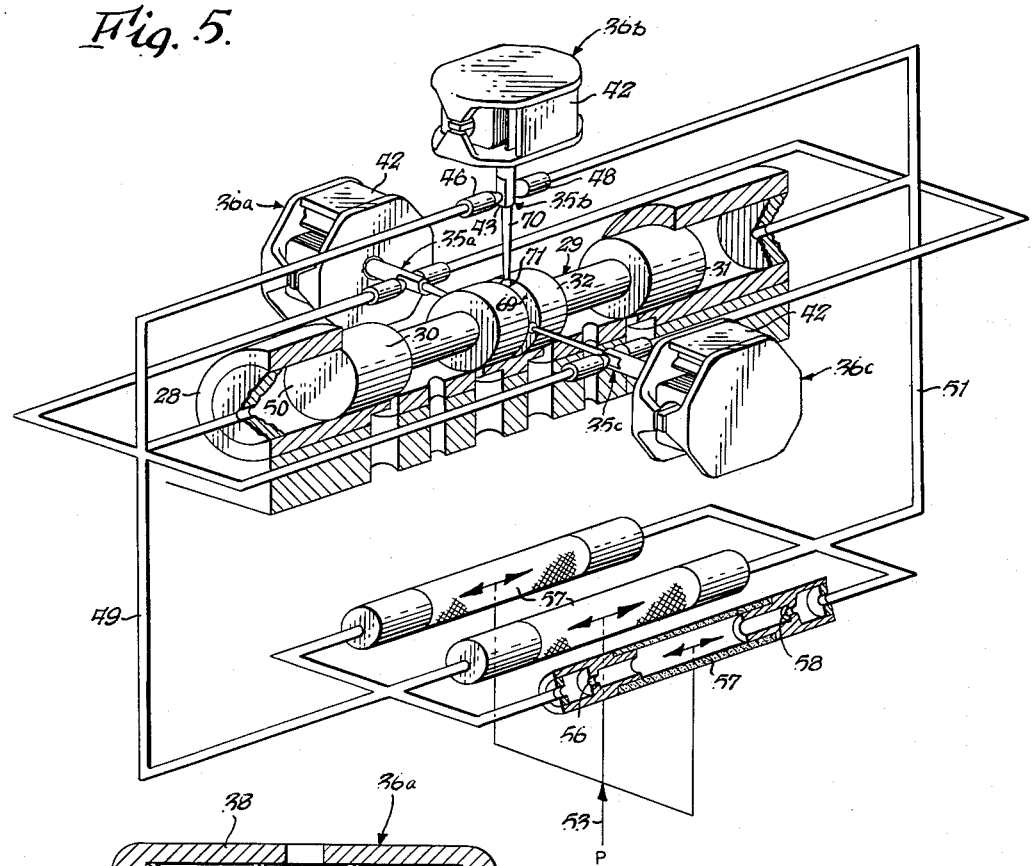

FIG. 5 is a perspective, partly elevational, partly sectional and partly diagrammatic view of the servovalve shown in FIG. 1 and further illustrating the principle of summing the effects of the fluid flows through the areas of the various variable orifices in the first stage fluid amplifier to provide a common pressure upstream of the orifices which is utilized to fluidly drive the second stage valve spool.

Figure 6:
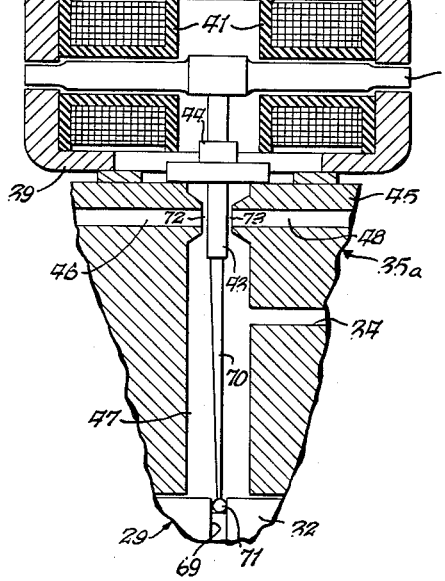

FIG. 6 is an enlarged central sectional view through one of the electromagnetic torque motor and flapper-nozzle fluid amplifier assemblies shown in the servovalve illustrated in FIG. 1.

FIG. 7 is a perspective diagrammatic view of a redundant, majority voting type electrohydraulic servovalve illustrating an example of a fluid powered servomechanism operating on the principle of summing pressure differentials and constituting another embodiment of the present invention.

FIG. 8 is an end elevational view of the valve spool shown in FIG. 7 and illustrating diagrammatically the application of pressures to several discrete end areas thereon.

Figure 9:
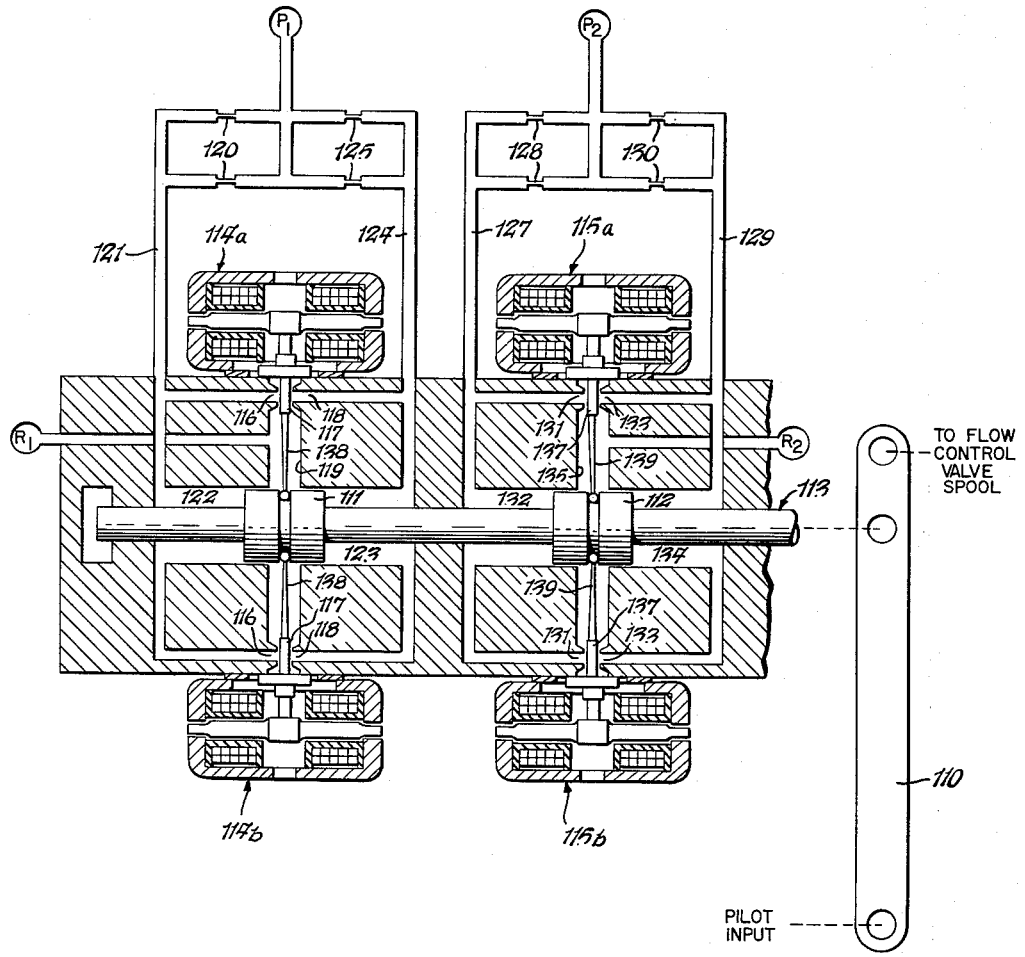

FIG. 9 is a somewhat diagrammatic view of an airplane flight control actuating system which accepts both pilot mechanical inputs and autopilot electrical inputs and illustrates as a third embodiment of the present invention a fluid powered servomechanism of the redundant, majority voting type having an actuator type rather than a valve spool type second stage and employing two isolated fluid supplies.

FIGS. 1–6

In FIG. 1 there is shown a rocket engine nozzle 10 having openings 11 on diametrically opposite sides thereof. Each such opening communicates with a chamber 12 supplied via the conduit 13 with injectant fluid under pressure derived from any suitable source. Associated with one opening 11 is a valve 14 and a similar valve 15 is associated with the other opening. The valve 14 has a piston head 16 slidably arranged in a cylinder 18 so as to provide chambers 19 and 20 on opposite sides of the piston head 16. The other valve 15 has a similar piston head 21 slidably arranged in a cylinder 22 so as to provide chambers 23 and 24 on opposite sides of the piston head 21.

The chambers 19 and 23 are connected in fluid conducting communication with a conduit or actuating line 25. A second conduit or actuating line 26 is shown connected in fluid conducting communication with the other chambers 20 and 24. The lines 25 and 26 are shown as communicating with actuating ports formed in a cylinder 28 in which a valve member represented generally by the numeral 29 is slidably arranged. This valve 29 is a reciprocable spool member having end lobes 30 and 31, and a center lobe 32. Fluid under pressure is supplied via a conduit 33 to ports adapted to be controlled by the position of the end lobes 30 and 31 of the spool 29. The center lobe 32 is operatively associated with a port communicating via the conduit 34 with a fluid return.

The valve spool 29 serves as the second stage of a two stage electrohydraulic servovalve in which the first stage comprises redundant fluid amplifiers severally indicated at 35a, 35b and 35c and associated severally with electromagnetic torque motors respectively indicated at 36a, 36b and 36c, three of each such amplifiers and motors being shown.

As best shown in FIG. 6 wherein the means 35a, 36a are illustrated as typical of the three fluid amplifiers and torque motors, the torque motor 36a comprises a pair of pole pieces 38 and 39 arranged in spaced relation to provide a pair of air gaps. In these air gaps is movably arranged an armature 40. The opposite end portions of this armature are surrounded by a pair of coils 41 housed between the pole pieces 38 and 39. Permanent magnets such as shown typically at 42 in FIG. 5 are interposed between the pole pieces 38 and 39, whereby a polarized torque motor is provided.

Rigidly connected centrally and in any suitable manner to the armature 40 and extending laterally therefrom is a flapper 43. The armature-flapper member 40, 43 so provided is supported for limited pivotal movement on a flexure tube 44 which is suitably sealingly mounted on the valve body as represented at 45 in FIG. 6. This flexure tube 44 is also sealingly connected to the flapper 43. A pair of fixed nozzles 46 and 48 are arranged in spaced relation to each other on opposite sides of the flapper 43 which is movably arranged therebetween. Structurally the nozzles 46 and 48 and the flapper 43 constitute the fluid amplifier 35a.

While a nozzle-flapper type fluid amplifier has been illustrated, it is to be understood that any other suitable type of fluid amplifier may be employed. For example, a fluid amplifier including a spool valve or jet type as a movable pressure regulating element responsive to a force, torque or position command input, is contemplated by the present inventive concept.

Referring again to FIG. 1, all of the left hand nozzles 46 for the three fluid amplifiers 35a, 35b and 35c are shown as being in fluid conducting communication with a conduit or line 49 which leads to the left spool end drive chamber formed between the left end wall of the cylinder 28 and the left end surface 50 of the spool 29. The other three nozzles 48 are shown as being in fluid conducting communication with a conduit or line 51 which leads to a spool end drive chamber formed by the right end wall of the cylinder 28 and the right end face 52 of the spool 29.

The opposite ends of the conduits 49 and 51 are shown as connected to a supply of pressurized fluid represented at 53, via three branch conduits or lines 54 associated with the conduit 49 and via three branch conduits or lines 55 associated with the other conduit 51. Each of the branch conduits 54 is shown as having a fluid flow restrictor or fixed orifice 56 arranged therein. A similar restrictor or fixed orifice 58 is shown as arranged in each of the branch conduits 55. As shown in FIG. 5, the corresponding pairs of fixed restrictors 56 and 58 are provided in an assembly which includes an upstream cylindrical filter screen 57.

Each of the torque motors 36a, 36b and 36c is shown as being supplied with an electrical command input signal via a line represented at 59a, 59b and 59c, respectively. An amplifier is shown as arranged in each of these lines. Thus an amplifier 60a is arranged in the line 59a, an amplifier 60b in the line 59b and an amplifier 60c in the line 59c.

While there has been illustrated a torque motor responsive to an electrical input, the command input can be any suitable torque, force or displacement input regardless of the specific nature of the mechanism which produces such input.

Feedback means are operatively interposed between the actuator pistons 16, 21 and the various amplifiers 60a, 60b, and 60c. As shown, three feedback transducers 61a, 61b and 61c which may be of any suitable construction, typically of the potentiometer type, have a movable element constrained to move with the movable piston head 16 via a stem 62. The transducer 61a is associated via the feedback line or conductor 63a with a summing point 64a arranged in the input line 59a in advance of the amplifier 60a therein. A similar feedback line or conductor 63b associates the transducer 61b with a summing point 64b arranged in the line 59b in advance of the amplifier 60b therein. Also, a similar feedback line or conductor 63c associates the third transducer 61c with the summing point 64c arranged in the input line 59c in advance of the amplifier 60c therein.

Operatively associated with the other actuator piston head 21 are three feedback transducers 65a, 65b and 65c. The movable elements of these transducers are associated with the piston head 21 by the stem 66. The various transducers 65a, 65b and 65c are operatively associated with the respective summing point 64a, 64b and 64c via feedback lines or conductors 68a, 68b and 68c, respectively.

Referring to FIGS. 1, 5 and 6 the center lobe 32 of the valve spool 29 is shown as having an annular groove 69 to receive one end of a mechanical force feedback element 70 mounted on each of the flappers 43 of the various fluid amplifiers 35a, 35b and 35c. This element 70 is shown as being a spring wire fixedly mounted at one end to its flapper and having a spherical enlargement 71 at its free end. This spherical enlargement 71 has a rolling contact on the walls forming the groove 69 so as to frictionlessly constrain the end of the spring wire 70 to move with axial displacement of the valve spool 29.

Any other suitable feedback means may be operatively interposed between the spool member and each of the hydraulic amplifiers. The feedback shown is a mechanical force applied directly to each of the flappers 43 of the fluid amplifiers 35a, 35b and 35c. Means other than a feedback spring wire 70 may be used to effect this. If the fluid amplifiers were of a different type but had a movable pressure regulating element other than a flapper, mechanical force feedback to such element could be provided. Also, indirect feedback to the fluid amplifiers could be provided by summing the feedback with the command input. For example, there could be electrical feedback between the valve spool member 29 and the coils 41 of the various torque motors 36a, 36b or 36c.

Referring now to FIG. 4 which is a simplified diagram of the hydraulic circuit shown in FIG. 1 insofar as the servovalve is concerned, it will be seen that a bridge circuit is formed in which the common pressurized fluid supply 53 is connected to the common fluid return 34 by the two main conduits 49 and 51. In the conduit 49 are the three upstream fixed restrictors 56 arranged in parallel and the three downstream nozzles 46 are also arranged in parallel. Likewise the conduit 51 has the three upstream fixed restrictors 58 and the three downstream nozzles 48. The various nozzles 46 and 48 to which fluid is supplied discharge such fluid into a sump chamber 47 which is in communication with the fluid return 34.

The disposition of the various oscillatable flappers 43 between the corresponding pairs of fixed nozzles 46 and 48 provides pairs of orifices having differentially variable areas indicated at 72 and 73 for each pair of nozzles. Thus if a flapper 43 is electrically induced to move closer to one of the corresponding pairs of nozzles 46 and 48, the orifices 72 and 73 are differentially varied insofar as effective area is concerned such that the area of one of these orifices enlarges while the area of the other is reduced differentially. The variable orifices or restrictors 72 are arranged in parallel in the line 49. The other variable orifices or restrictors 73 are arranged in parallel in the other line 51.

The spool member 29 and the chamber 28 in which it is reciprocably arranged is operatively interposed between the conduits 49 and 51 so that the left end face 50 of the spool communicates with the conduit 49 intermediate the fixed restrictors 56 and the variable restrictors 72 while the right hand end face 52 of the spool communicates with the conduit 51 intermediate the fixed restrictors 58 and the variable restrictors 73.

This arrangement forms a hydraulic bridge circuit which is even more diagrammatically illustrated in FIG. 3. Referring to FIG. 3, it will be seen that the pressure supply 53 and return 34 are connected by the lines 49 and 51 with the fixed restrictors 56 arranged in parallel being interposed in the upstream portion of the line 49 and the other bank of parallel-arranged fixed restrictors 58 being arranged in the upstream portion of the other line 51. In the downstream portions of these lines 49 and 51 are the parallel-arranged respective banks of variable restrictors 72 and 73, respectively. The differential connection between corresponding pairs of variable orifices or restrictors 72 and 73 are represented by the broken lines 431 which signify the various flappers 43.

Still referring to FIG. 3, pressurized fluid entering the upstream end of each of the lines 49 and 51 will experience a pressure drop as it flows through the banks of fixed restrictors 56 and 58, respectively. The respective fluid pressures in the lines 49 and 51 downstream of the fixed restrictors 56 and 58 will depend upon the respective effective areas of the variable restrictors 72 and 73. These areas are controlled by the position of the flappers 43 with respect to the nozzles 46 and 48. If, for example, the restrictor 72 has a smaller effective area than that of the corresponding restrictor 73, it will be seen that a pressure differential represented by the symbol $\Delta P$ is provided with the higher pressure being in line 49. This pressure differential is utilized to fluidly drive the reciprocable member 29.

Referring now to FIG. 2, if each torque motor 36a, 36b and 36c is energized by the same input current an electrically induced displacement of the flapper of the flapper-nozzle combination or fluid amplifier means 35a, 35b and 35c, is urged. The flapper-nozzle combinations produced orifices of variable area which are effectively summed at the summing point 74 represented in FIG. 2. Through the bridge circuit described and shown in FIGS. 3 and 4, a pressure differential is produced for driving the valve spool 29. Mechanical force feedback of the spool position is transmitted through the respective feedback springs 70 to torque summing points represented at 75a, 75b and 75c in FIG. 2. Displacement of the valve spool 29 will control the flow of fluid through the actuating lines 25 and 26.

The operation of the embodiment shown in FIG. 1 may briefly be described by considering that the same input current or electrical command signal is supplied to each of the lines 59a, 59b and 59c to the left of each of the respective summing points 64a, 64b and 64c. This common signal passes through the various amplifiers 60a, 60b and 60c and energizes the coils 41 of the various torque motors, in the well known manner. Such energization urges the armature-flapper members 40, 43 to pivot, being permitted to do so by bending of the flexure tubes 44. This will move the flappers with respect to their fixed nozzles 46 and 48 and produce variable orifices 72 and 73 of differential areas. The effects of the fluid flows through the orifice areas 72 combine to provide an upstream common pressure in the line 49 which is applied to the spool end surface 50. This common pressure will have a value dependent upon the size of these orifice areas so that the larger these areas are, the lower the upstream pressure in line 49 will be, and vice versa. Similarly, the effects of the fluid flows through the orifice areas 73 are summed to provide an upstream common pressure in the line 51 which is applied to the spool end surface 52.

Such summing of the two arrays of orifices produces a net pressure differential which is used to fluidly drive the spool member 29. This will displace this spool member and through the various ports provided in the spool cylinder 28 will control the flow of fluid in the conduits 25 and 26 associated with the injector valves 14 and 15. Thus, if the spool is displaced to the right as viewed in FIG. 1, it will be seen that pressurized fluid will pass from the supply line 33 into the line 25 whereas the conduit 26 will communicate with the fluid return line 34. This pressure differential in the lines 25 and 26 will urge the upper injector valve 14 to a more firmly seated closed position whereas the lower injector valve 15 will be urged to open, thereby allowing pressurized fluid to enter the engine nozzle 10 in a controlled amount.

If on the other hand, the valve spool member 29 is displaced to the left as viewed in FIG. 1, the actuating conduit 26 will communicate with the pressurized fluid supply line 33 whereas the other actuating conduit 25 will be placed in communication with the fluid return line 34. This reverses the operation of the injector valves described above. Thus, the upper injector valve 14 is now urged upwardly to unseat the same and allow fluid to enter the engine nozzle, whereas the lower injector valve 14 is urged upwardly to a more firmly seated position.

Displacement of one or the other of the injector valves 14 and 15 will cause the respective transducers 61a, 61b and 61c or 65a, 65b and 65c to generate an electrical feedback signal which is of opposite sign or sense to that of the input electrical command signal. These signals are summed at the points 64a, 64b and 64c and the error or resultant signals are amplified and fed to the respective torque motors.

For each motor, its error signal will energize the coils 41 and urge the corresponding armature-flapper member 40, 43 to pivot in the appropriate direction depending upon the sense of the error signal, thus differentially varying the areas of the orifices 72 and 73 accordingly. These areas for the orifices 72 are effectively summed as are those for the orifices 73 so as to produce a pressure differential on the valve spool 29 to displace the same. This valve spool will displace thereby bending the feedback spring wires 70 until the electrically induced torque on each armature-flapper member 40, 43 is counterbalanced by the torque produced by the corresponding bent feedback spring wire. When this torque balance is achieved, the valve spool 29 will be in a predetermined displaced position proportionate to the command signal.

In the system shown in FIG. 1, the two injector valves 14 and 15 are fluidly interlocked to form a single bidirectional control. The supply pressure P to the servovalve is preferably obtained directly from the pressurized injectant fluid, so that redundancy of the pressure system is unnecessary.

This system illustrates how majority voting at the output of the servovalve driving fluid amplifiers, as shown at 74 in FIG. 2, protects against failure of any redundant element ahead of the valve.

To illustrate, let it be assumed that the feedback transducer 61a fails hardover, thus developing a saturation feedback signal that would completely dominate the command input signal to the summing point 64a. The output of the amplifier 60a in channel 59a would therefore differ from the amplifier outputs in channels 59b and 59c.

Let it be further assumed that such different output of amplifier 60a causes the fluid amplifier 35a to pivot its armature-flapper member 40, 43 in a clockwise direction, as viewed in FIGS. 1 and 6, so as to change drastically or seal off its nozzle 46. This causes a build up of pressure in the conduit 49 and hence against the spool end surface 50. The spool 29 then moves from its desired previous position, rightward as viewed in FIG. 1. This rightward displacement of the spool 29 immediately creates a correction in the nature of a counterclockwise torque on each armature-flapper member 40, 43 due to deflection of the feedback spring wires 70.

Since it has been assumed that the electrical failure in the feedback transducer 61a produced a completely dominating torque on the armature 40 of motor 36a, the corresponding feedback spring wire 70 will be unable to change the hardover condition of flapper 43 of amplifier 35a. However, since the feedback spring wires 70 associated with the other two torque motors 36b and 36c will have been deflected also in a counterclockwise direction by displacement of the valve spool, there results a counterclockwise motion of the flappers 43 of the fluid amplifiers 35b and 35c. Such motion differentially closes their orifice areas 73 and opens their orifice areas 72, thereby tending to reestablish a balance in fluid pressure in the conduits 49 and 51. This correction attempts to reposition the valve spool 29 at the desired null position. The error in spool position which remains will depend upon the gain of the feedback corrections developed by the feedback spring wires 70 and other design parameters of the servomechanism.

However, it can be seen that the limit imposed by flapper 43 of fluid amplifier 35a bottoming on its nozzle 46, together with the gain of the corrective effect developed by the feedback spring wires 70, reduce significantly the change in valve spool position caused by the assumed hardover condition. Typically, this change may be held to less than 5% of full valve spool displacement.

Nevertheless, the spool did deviate a small amount to the right and this opens supply pressure to conduit 25 allowing fluid to flow into chamber 23 thereby opening injector valve 15. Such opening of injector valve 15 develops a feedback signal from transducers 65a, 65b and 65c tending to correct for the change in position of this injector valve. This correction is provided electrically to all three torque motors 36a, 36b and 36c and of a polarity tending to move each torque motor armature 40 counterclockwise, as viewed in FIGS. 1 and 6.

Since it has been assumed that the effect of the failure in transducer 61a completely dominates the ouput from amplifier 60a, the additional electrical feedback from transducer 65a can produce no significant change at the torque motor 36a. However, similar electrical feedback from the transducers 65b and 65c will produce an additional correction which results in further counterclockwise motion in the armatures 40 in torque motors 36b and 36c. This corrective action provided by the electrical feedback from the transducers will continue until the combined hydraulic orifice bridges are again in balance, producing zero differential pressure in conduits 49 and 51 and returning the valve spool 29 to its null position.

The change in position of injector valve 21 needed to correct completely for the assumed hardover failure will be that corresponding to limited change in servovalve spool position, which was mentioned hereinabove typically to be less than 5%, and this error in injector valve position can be made negligibly small by having sufficient electrical gain in the feedback transducer components 61a, 61b, 61c, 65a, 65b and 65c and the servo amplifiers 60a, and 60b and 60c.

Thus it can be seen that the action of the individual feedbacks provided by the feedback spring wires 70, together with the limited authority associated with nozzle seal-off, create a situation whereby a majority of unfailed or properly functioning components can overpower and outvote the action of a failed or improperly functioning component. Essential to voting is the feedback effect which tries to correct for the error output of the fluid amplifier. The movable pressure regulating element of the fluid amplifier is just as responsive to feedback as it is to command input signal.

Majority voting action will take place for other failures in the system shown in FIG. 1 external to the redundant servovalve, such as a failure in a servo amplifier or command input signal, besides the specifically described example of a failure in a feedback transducer. Likewise, it can be seen that this majority voting action will take place for failures in any one of the three control assemblies including torque motors and fluid amplifiers, as well as in a failure external to such assemblies, which results in a similar difference in action in one of the three channels.

It can be also seen that the redundant, majority voting servomechanism will work to correct for failure modes of the system other than one producing a hardover condition, such as a partial hardover of a flapper resulting in excessive null shift of the second stage movable member, a fail open such as a broken wire in a torque motor coil or in a connecting cable, or partial or complete clogging of a fluid amplifier nozzle.

Functionally the three pairs of fixed flow restrictors or inlet orifices 56 and 58 shown in FIGS. 1, 3 and 4 are not necessary for the majority voting action of a redundant servomechanism as above described. However, use of three parallel fixed orifices at an upstream location in each bridge line 49 and 51 is consistent with the redundant philosophy involved, in that clogging or other failure of a single inlet orifice 56 or 58 will not result in failure of the servomechanism but instead will produce a change which can be overcome by normal servomechanism action.

It will be appreciated that while three similar means for fluidly driving the valve spool member 29 have been shown in the embodiment illustrated in FIGS. 1–6, this is a minimum number necessary to achieve majority voting. A larger number may be employed if a greater degree of redundancy is desired.

FIGS. 7 AND 8

Instead of effectively summing the variable orifice areas as was done in the embodiment shown in FIGS. 1–6, the pressure differentials generated by the various fluid amplifiers may be effectively summed. This latter arrangement is illustrated in FIGS. 7 and 8. There a spool 78 has at its left end three axially facing drive surfaces 79, 80 and 81 which are of equal area. These drive surfaces 79–81 face in the opposite axial direction from those at the opposite or right end of the spool 78. The cylinder in which the spool member 78 is reciprocably arranged is not illustrated in FIG. 7 except for a suggested stepped end configuration indicated by broken lines at 82 at each end. Thus three fluid drive chambers will be provided at each end of the spool.

At the left end of the spool, fluid communicates with the surface 79 via the conduit or line 83, with the surface 80 via the conduit or line 84, and with the surface 81 via the conduit or line 85. The lines 83–85 are shown as being branch lines with respect to main conduits or lines 86, 87 and 88, respectively. In each of these lines 86–88 is a fixed flow restrictor 89 arranged upstream of the corresponding branch line. The various main lines 86–88 communicate with a common pressure supply line 90. The opposite ends of these lines 86–89 severally terminate in nozzles 91.

Associated with the end are as 79–81 at the opposite or right end of the valve spool 78, as viewed in FIG. 7, are branch lines 92, 93 and 94 which communicate severally with main conduits or lines 95, 96 and 97, respectively. Each of the main lines 95–97 has a fixed flow restrictor 98 therein upstream of the various branch lines and further upstream these lines 95–97 communicate with a common supply line 99. The opposite ends of the various lines 95–97 terminate in a nozzle 100. Each opposing pair of nozzles 91 and 100 has a flapper 101 arranged therebetween which jointly therewith provides a fluid amplifier which is associated with an electromagnetic torque motor indicated generally at 102. A feedback spring wire 103 is shown as cantilever-mounted on one end of its flapper 101 and the opposite end is provided with a spherical ball enlargement 104 which is arranged in an annular groove 105 provided in the valve spool 78 and rollingly engages the walls of this groove.

The operation of the fluid circuit shown in the embodiment illustrated in FIG. 7 operates similar to that described for the embodiment in FIGS. 1–6 except that in FIG. 7 the various pairs of corresponding nozzles 91 and 100 produce differentially variable orifices which produce a first pressure differential in the branch lines 83 and 92 which apply this pressure differential to the end surfaces 79, a second pressure differential in the branch lines 84 and 93 which apply the corresponding pressure differential to the end surfaces 80, and a third pressure differential in the branch lines 85 and 94 which apply the corresponding pressure differential to the end surfaces 81. In this manner the various pressure differentials developed by the three fluid amplifiers are transmitted directly to separate drive surfaces on the spool member. The result is that the fluid drive effects of these pressure differentials are summed.

The summing of at least three pressure differentials in the servomechanism shown in FIGS. 7 and 8 still uses a like number of feedback connections between the second stage movable member and each of the several first stage fluid amplifiers so that the conditions necessary for majority votitng are present.

Of course, if redundancy to a higher degree is desired, more than three control assembles including fluid amplifiers, torque motors and feedback springs, may be employed but then a corresponding number of pairs of oppositely facing drive surfaces on the fluid driven member must be provided.

FIG. 9

FIG. 9 shows an airplane flight control actuation system which accepts both pilot mechanical inputs applied to the end of a control lever 110 and autopilot electrical inputs which are applied to the various torque motors to be described. The system incorporates a dual tandem servovalve and actuator (not shown) to permit use of two isolated fluid supplies. A flow control valve spool (not shown) is operatively connected to the lever 110 where indicated and also is operatively associated with a fluid operated actuator (not shown). Electrical inputs from a dual channel redundant autopilot (not shown) are converted to a mechanical displacement by tandem pistons 111 and 112 arranged on a rod which collectively constitute a movable member 113 which has a suitable connection with the lever 110 intermediate the ends thereof.

Each tandem piston 111 and 112 is shown as driven by a pair of control assemblies each comprising a fluid amplifier and associated torque motor, such assemblies being indicated at 114a and 114b for the spool 111 and indicated at 115a and 115b for the spool 112. The fluid amplifier of each of the means 114a and 114b is shown as including a flapper 117 and a pair of nozzles 116 and 118 which discharge into a sump chamber 119 having fluid communication with a fluid return $R_1$. The nozzles 116 and 118 are supplied with pressurized fluid from a first fluid supply $P_1$, such supply being through a pair of fixed flow restrictors 120 arranged in parallel in communication with a conduit 121 which communicates with the nozzles 116 and with a spool end chamber 122 to the left of the piston 111. The other nozzles 118 and right hand piston chamber 123 are supplied with fluid via a conduit 124 which through branch lines arranged in parallel and severally including fixed flow restrictors 125 communicate with the pressure supply $P_1$. Thus a first fluid circuit is established.

A second similar fluid circuit is established including a fluid supply $P_2$, a fluid return $R_2$, a first conduit 127 having therein fixed flow restrictors 128 arranged in parallel interposed between this line and the pressure supply $P_2$, and a second conduit 129 having a pair of parallel-arranged fixed flow restrictors 130 connecting this line with the pressure supply $P_2$. The line 127 communicates with nozzles 131 for each of the means 115a and 115b and with a chamber 132 to the left of the piston 112. The other nozzles 133 communicate with the conduit 129 as does also the chamber 134 to the right of the piston 112. A flapper 137 is disposed between each corresponding pair of nozzles 131 and 133 which discharge fluid into the sump chamber 135 which communicates with the fluid return $R_2$.

A feedback spring wire 138 is shown as operatively interposed between the piston 111 and each of the flappers 117, and a similar feedback spring wire 139 is shown as operatively interposed between the piston 112 and each of the flappers 137. Thus mechanical force feedback is provided between the movable member 113 and the movable element of each of the fluid amplifiers.

Fluid induced displacement of the movable member 113 is summed with the pilot input to drive the flow control valve spool (not shown). Identical electrical inputs to the various means 114a, 114b, 115a and 115b are normally present.

It can be seen that each corresponding pair of torque motor and fluid amplifier assemblies 114a, 114b or 115a, 115b are arranged in a majority voting configuration similar to that described in connection with FIGS. 1–6.

That is to say, such assemblies are arranged with effective orifice area summation in the fluid amplifiers.

It can also be seen that the outputs from the two pairs of fluid amplifiers are summed as pressures developed on the head areas of the movable member 113 in a manner analogous to the summation described with reference to FIGS. 7 and 8.

Therefore, the outputs of the four fluid amplifiers are summed to produce a common output active on the movable member 113.

In the event of failure of a single torque motor, fluid amplifier, servo amplifier (not shown in FIG. 9), or other component of the redundant configuration of servomechanism system, a majority voting action will result in which three unfailed chanels outvote or override the failed fourth channel.

Should there be a failure in one of the fluid supplies $P_1$ or $P_2$, this will remove control from the corresponding pair of fluid amplifiers. However, since this failure can only be passive, that is, the failure will not attempt to overpower the remaining channels, then it can be seen that the output from the two fluid amplifiers still working will be sufficient to maintain control of the output member 113.

While two fluid amplifiers are shown in FIG. 9 associated operatively with each fluid supply, any additional number may be similarly combined.

It is pointed out that tandem pistons 111 and 112 could be ganged valve spools, analogous in function to valve spool 29 shown in FIGS. 1, 4 and 5, to provide a redundant, majority voting servovalve suitable for use with dual fluid pump supplies.

The fluid powered servomechanisms of the present invention are not confined to the handling of liquids but gases may also be the working medium; hence the term "fluid" is intended to cover either a liquid or a gas.

From the foregoing, it will be seen that the various embodiments of the invention illustrated achieve the objects stated. Since various modifications not mentioned may occur to those skilled in the art, these embodiments are intended to be illustrative and not limitative of the present invention the scope of which is to be measured by the appended claims.

What is claimed is:

1. In a fluid powered servomechanism, the combination comprising a movable member, at least three fluid amplifier means having their several outputs operatively summed to fluidly drive said member and each including a movable pressure regulating element responsive to a command input and movable independently of the other of such elements, and separate mechanical force feedback means for each of said elements and operatively interposed between said member and the corresponding one of said elements.

2. In a fluid powered servomechanism, the combination comprising a movable member having a drive surface, at least three fluid amplifier means each arranged to provide a fluid discharge orifice of variable area the size of which is responsive to a command input, main fluid conduit means, flow restrictor means operatively arranged in said main conduit means, branch fluid conduit means severally establishing communication between said orifices and said main conduit means downstream of said restrictor means, means establishing fluid conducting communication between said surface and said main conduit means intermediate said restrictor means and said branch conduit means, whereby the fluid flows through said areas provide a common pressure which is applied to said drive surface, and feedback means operatively interposed between said member and each of said amplifier means.

3. In a fluid powered servomechanism, the combination comprising first fluid conduit means, second fluid conduit means, upstream fixed flow restrictor means operatively arranged in each of said conduit means, downstream variable flow restrictor means operatively arranged in each of said conduit means including at least three fluid amplifier means each arranged to provide first and second orifices of differentially variable areas the sizes of which are responsive to a command input, first means operatively arranging said first orifices in parallel in said first conduit means and second means operatively arranging said second orifices in parallel in said second conduit means, a fluid driven reciprocable member having first and second drive surfaces facing in opposite directions, first means for applying to said first surface the pressure in said first conduit means intermediate said fixed and variable restrictor means therein, second means for applying to said second surface the pressure in said second conduit means intermediate said fixed and variable restrictor means therein, and feedback means operatively interposed between said member and each of said amplifier means.

4. In a fluid powered servomechanism, the combination comprising first fluid conduit means, second fluid conduit means, upstream fixed flow restrictor means operatively arranged in each of said conduit means, downstream variable flow restrictor means operatively arranged in each of said conduit means including at least three fluid amplifier means each arranged to provide first and second orifices of differentially variable areas the sizes of which are responsive to a command input, first means operatively arranging said first orifices in parallel in said first conduit means and second means operatively arranging said second orifices in parallel in said second conduit means, a fluid driven reciprocable member having first and second drive surfaces facing in opposite directions, first means for applying to said first surface the pressure in said first conduit means intermediate said fixed and variable restrictor means therein, second means for applying to said second surface the pressure in said second conduit means intermediate said fixed and variable restrictor means therein, common fluid supply means for said first and second conduit means upstream of said fixed restrictor means therein, common fluid return means for said first and second conduit means downstream of said variable restrictor means therein, and feedback means operatively interposed between said member and each of said amplifier means.

5. In a fluid powered servomechanism, the combination comprising a reciprocable member having first and second drive surfaces facing in opposite directions, at least three electromagnetic torque motor means, a like number of fluid amplifier means severally and operatively associated with said motor means and each including a pair of fixed nozzles and a flapper movably arranged with respect to said nozzle and responsive to an electrical input to its said motor means, each of said flappers and associated nozzles providing first and second orifices of differentially variable areas, first means for summing the effects of the fluid flows through those of said nozzles which form said first orifices to provide a first common pressure upstream of said first orifices which is applied to said first surface, second means for summing the effects of the fluid flows through those of said nozzles which form said second orifices to provide a second common pressure upstream of said second orifices which is applied to said second surface, and mechanical force feedback means operatively interposed between said member and each of said flappers.

6. In a fluid powered servomechanism, the combination comprising a fluid driven reciprocable member having a plurality of pairs of drive surfaces facing in opposite directions in each pair, at least three fluid amplifier means each arranged to provide a fluid pressure differential responsive to a command input, means for applying said pressure differentials severally to said pairs of surfaces to sum the drive effects of said pressure differentials, and feedback means operatively interposed between said member and each of said amplifier means.

(References on following page)

References Cited by the Examiner

UNITED STATES PATENTS

| | | | |
|---|---|---|---|
| 451,100 | 4/1891 | Wright | 91—427 |
| 2,247,301 | 6/1941 | Lesser | 91—3 |
| 2,826,896 | 3/1958 | Glaze | 91—363 |
| 2,904,056 | 9/1959 | Callender | 91—3 |
| 2,921,562 | 1/1960 | Westbury | 91—6 |
| 2,947,286 | 8/1960 | Baltus | 91—387 |
| 2,964,059 | 12/1960 | Geyer | 137—625.62 |
| 2,995,116 | 8/1961 | Dobbins | 91—387 |
| 3,054,416 | 9/1962 | Lucien | 137—625.62 |

SAMUEL LEVINE, *Primary Examiner.*

FRED E. ENGELTHALER, *Examiner.*

P. T. COBRIN, *Assistant Examiner.*